United States Patent
Klein et al.

(10) Patent No.: US 9,703,959 B2
(45) Date of Patent: Jul. 11, 2017

(54) DYNAMIC VERIFICATION OF A COMPUTER SOFTWARE APPLICATION EXECUTION PATH

(71) Applicant: International Business Machines Corporation, Armonk, NY (US)

(72) Inventors: Amit Klein, Herzliya (IL); Shmuel Regev, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/453,851

(22) Filed: Aug. 7, 2014

(65) Prior Publication Data
US 2016/0042182 A1 Feb. 11, 2016

(51) Int. Cl.
G06F 21/00 (2013.01)
G06F 21/56 (2013.01)
H04L 9/32 (2006.01)
G06F 21/55 (2013.01)
G06F 21/57 (2013.01)

(52) U.S. Cl.
CPC .......... G06F 21/566 (2013.01); G06F 21/552 (2013.01); G06F 21/56 (2013.01); G06F 21/57 (2013.01); H04L 9/3234 (2013.01); G06F 2221/033 (2013.01)

(58) Field of Classification Search
CPC .. G06F 21/566; G06F 2221/033; G06F 21/57; G06F 21/552; G06F 21/56; H04L 9/3234
See application file for complete search history.

(56) References Cited

U.S. PATENT DOCUMENTS

| 6,071,316 A * | 6/2000 | Goossen | G06F 11/3612 714/E11.209 |
| 7,194,664 B1 * | 3/2007 | Fung | G06F 11/3636 714/32 |
| 8,701,187 B2 * | 4/2014 | Schluessler | G06F 13/28 713/164 |
| 2006/0161978 A1 * | 7/2006 | Abadi | G06F 21/52 726/22 |
| 2014/0047524 A1 * | 2/2014 | Auger | G06K 5/00 726/7 |

* cited by examiner

*Primary Examiner* — Mahfuzur Rahman
*Assistant Examiner* — Narciso Victoria
(74) *Attorney, Agent, or Firm* — Nicholas L. Cadmus

(57) ABSTRACT

Dynamic verification of a computer software application execution path by detecting execution of a target instruction of a computer software application, wherein the computer software application is configured to generate a token at an instruction near a waypoint instruction of the computer software application, and wherein the waypoint instruction lies along an execution path that leads to the target instruction. Determining, responsive to detecting execution of the target instruction, whether a token exists. Performing a computer-security-related remediation action responsive to determining that the token does not exist.

15 Claims, 3 Drawing Sheets

DYNAMIC VERIFICATION OF A COMPUTER SOFTWARE APPLICATION EXECUTION PATH

FIELD OF THE INVENTION

The present invention relates generally to computer security, and more particularly, to dynamic verification of a computer software application execution path.

BACKGROUND OF THE INVENTION

Execution in computer and software engineering is the process by which a computer or a virtual machine performs the instructions of a computer program. The instructions in the program trigger sequences of simple actions on the executing machine. Those actions produce effects according to the semantics of the instructions in the program.

SUMMARY

In one aspect of the present invention a method is provided for dynamic verification of a computer software application execution path, the method includes detecting, by one or more processors, execution of a target instruction of a computer software application, wherein the computer software application is configured to generate a token at an instruction near a waypoint instruction of the computer software application, and wherein the waypoint instruction lies along an execution path that leads to the target instruction. The method further includes determining, by one or more processors, responsive to detecting execution of the target instruction, whether a token exists. The method further includes performing, by one or more processors, a computer-security-related remediation action responsive to determining that the token does not exist.

In other aspects of the invention systems and computer program products embodying the invention are provided.

BRIEF DESCRIPTION OF THE SEVERAL VIEWS OF THE DRAWINGS

Aspects of the present invention will be understood and appreciated more fully from the following detailed description taken in conjunction with the appended drawings in which.

DETAILED DESCRIPTION

Figure 1:
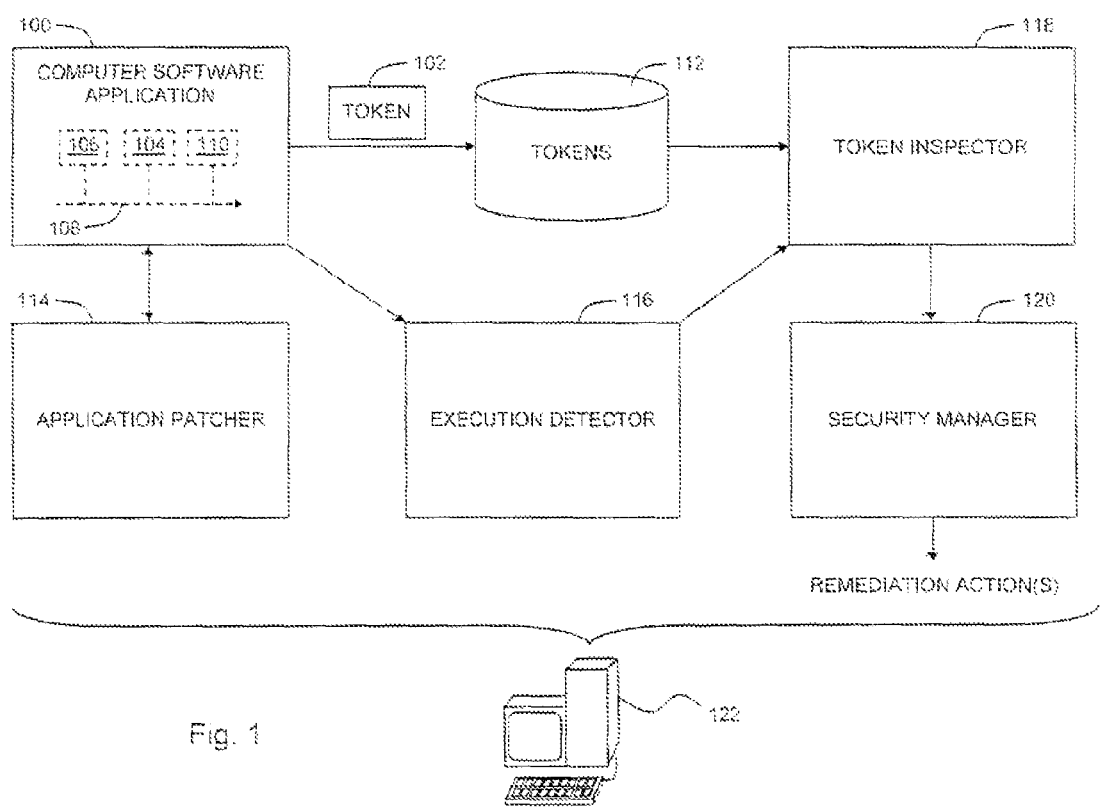
FIG. 1 is a simplified conceptual illustration of a system for dynamic verification of a computer software application execution path, constructed and operative in accordance with an embodiment of the present invention.

Embodiments of the present invention recognize that in order to take advantage of certain computer security vulnerabilities, some malefactors have developed methods to divert common computer software applications from their standard execution paths, causing the applications to run malicious code that is provided by attackers. Embodiments of the present invention allow for dynamic verification of a computer software application execution path. Implementation of embodiments of the invention may take a variety forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a system for dynamic verification of a computer software application execution path, constructed and operative in accordance with an embodiment of the present invention. In the system of FIG. 1, a computer software application 100 is configured to generate a token 102 of data at a token generation instruction 104 that is located near, and preferably immediately before or after, a waypoint instruction 106 of computer software application 100, such that when waypoint instruction 106 is executed, token generation instruction 104 is also executed, and token 102 is generated. Waypoint instruction 106 may be any instruction within computer software application 100 that lies along an execution path 108 that leads to a target instruction 110, where waypoint instruction 106, target instruction 110, and execution path 108 are identified using conventional techniques, such as by performing static or dynamic analysis on computer software application 100. Target instruction 110 may be any type of instruction, but is preferably any type of instruction that is known to be targeted for misuse, such as by malware, including process creation calls and remote thread creation calls.

Token 102 is preferably associated with target instruction 110, such as by storing within token 102, or otherwise in association with token 102, a copy of target instruction 110 and/or an address that indicates a computer memory address where target instruction 110 is located. Token 102 also preferably includes an expiration time for the token, where the expiration time is preferably calculated as the time when token 102 is generated plus an expected elapsed time between execution of waypoint instruction 106 and execution of target instruction 110, where the expected elapsed time may be determined empirically by observing computer software application 100 during its execution. Token 102 and its related data are preferably maintained in a data store of tokens 112 using any conventional data storage technique. Token 102 and its related data are also preferably encrypted prior to their storage in accordance with conventional techniques.

Computer software application 100 may be configured as described hereinabove during the development of computer software application 100 using conventional software coding techniques, or afterward, such as by employing an application patcher 114 that is configured to modify computer software application 100 during its execution using conventional patching techniques. Application patcher 114 is optionally configured to identify waypoint instruction 106, target instruction 110, execution path 108, and the expected elapsed time between execution of waypoint instruction 106 and execution of target instruction 110 using conventional techniques as described hereinabove.

An execution detector 116 is configured to detect the execution of target instruction 110 of computer software application 100 using conventional techniques. A token inspector 118 is configured to determine, responsive to the execution of target instruction 110, whether a token exists that is associated with target instruction 110. Token inspector 118 is also preferably configured to determine, if such a token does exist, whether the token is expired, as indicated by the expiration time stored in association with the token, and as compared with the time when target instruction 110 is executed.

A security manager 120 is configured to perform one or more predefined computer-security-related remediation actions in response to token inspector 118 determining that a token does not exist for a given execution of a target instruction, such as target instruction 110, or that such a token does exist, but is expired. The remediation actions may, for example, include terminating the execution of computer software application 100, and/or providing a computer-security-related notification reporting the activity, such as to a user or administrator of the computer where computer software application 100 is executed.

Any of the elements shown in FIG. 1 are preferably executed by or otherwise made accessible to a computer, such as computer 122, by implementing any of the elements in computer hardware and/or in computer software embodied in a computer readable storage medium in accordance with conventional techniques.

Figure 2:
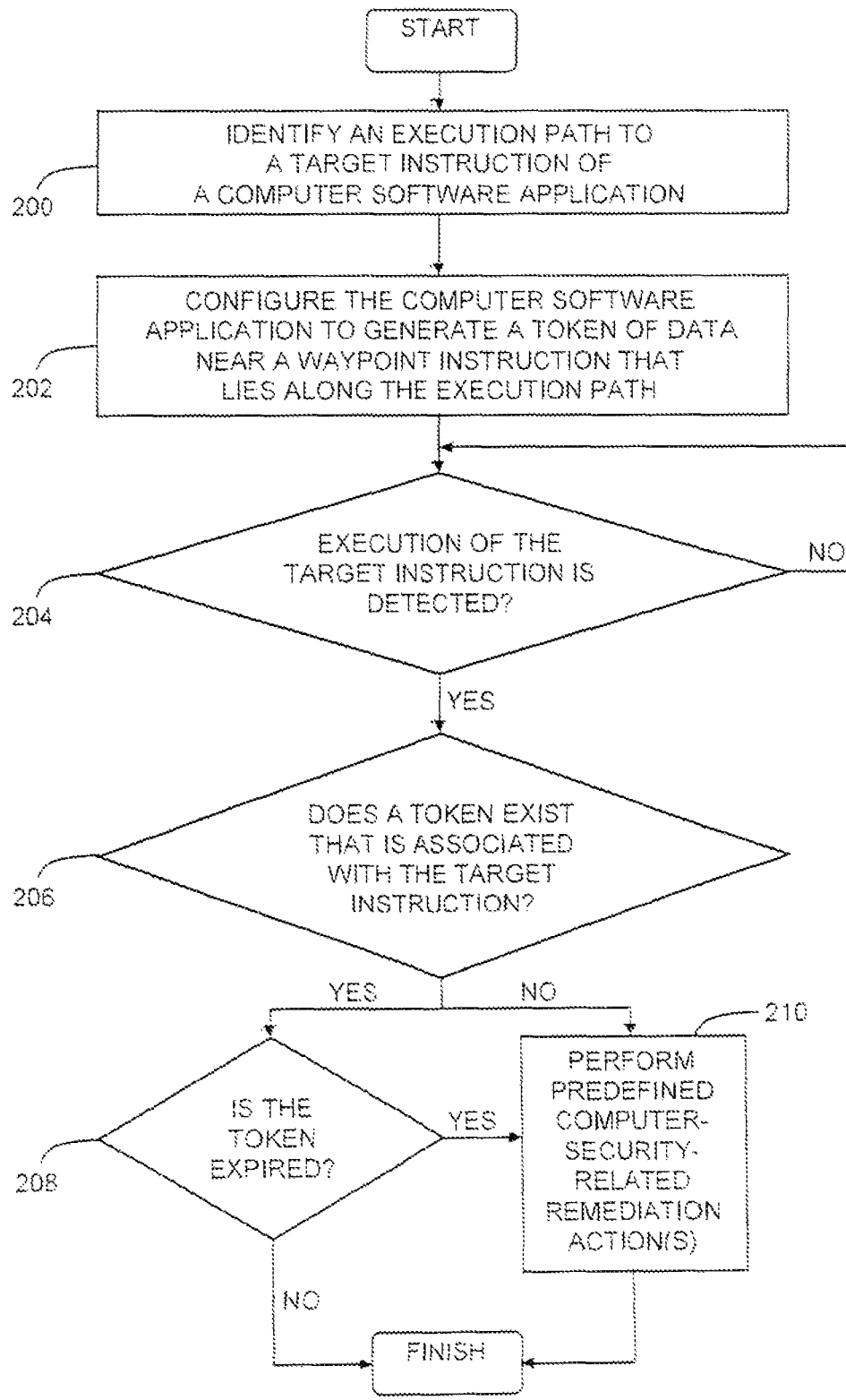
FIG. 2 is a simplified flowchart illustration of an exemplary method of operation of the system of FIG. 1, operative in accordance with an embodiment of the present invention.

Reference is now made to FIG. 2 which is a simplified flowchart illustration of an exemplary method of operation of the system of FIG. 1, operative in accordance with an embodiment of the present invention. In the method of FIG. 2, an execution path to a target instruction of a computer software application is identified (step 200). The computer software application is configured to generate a token of data near a waypoint instruction that lies along the execution path (step 202), where the token is associated with the target instruction and includes an expiration time for the token. When execution of the target instruction is detected (step 204), if a token does not exist that is associated with the target instruction (step 206), or if such a token does exist, but is expired (step 208), one or more predefined computer-security-related remediation actions are performed (step 210).

The system of FIG. 1 and method of FIG. 2 may be illustrated in the context of the following exemplary scenario in which:

Analysis of a browser application is performed, resulting in the identification of an execution path among the instructions of the browser application to a process creation call instruction;

A waypoint instruction is identified that is along the execution path, and an expected elapsed time between execution of the waypoint instruction and execution of the target instruction is determined by observing the execution of the browser application;

The browser application is patched to cause a token to be generated when the waypoint instruction is executed, where the token is associated with the target instruction and includes an expiration time for the token that is calculated as the time when the token is generated plus the expected elapsed time;

The waypoint instruction is executed, causing the token to be generated;

The execution of the target instruction is detected, whereupon a search is performed to determine whether an unexpired token exists that is associated with the target instruction;

The previously-generated token is found, but it is expired;

Since more time than expected passed between execution of the waypoint instruction and the target instruction, this may indicate an unauthorized deviation of the related execution path, and execution of the browser application is terminated as a precaution.

Figure 3:
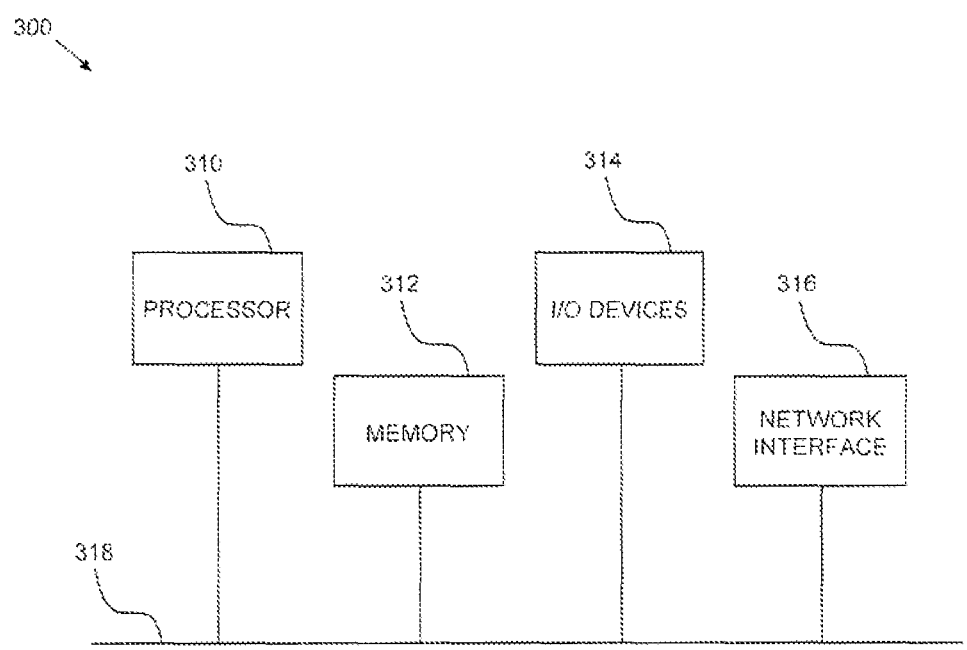
FIG. 3 is a simplified block diagram illustration of an exemplary hardware implementation of a computing system, constructed and operative in accordance with an embodiment of the present invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic verification of a computer software application execution path, the method comprising:

generating, by one or more processors, responsive to detecting execution of a waypoint instruction of a computer software application, a token indicating an expiration time for the token as the time when the token is generated plus an expected elapsed time between execution of the waypoint instruction and execution of a target instruction of the computer software application;

detecting, by one or more processors, execution of the target instruction of the computer software application, wherein the computer software application is configured to generate the token at an instruction near the waypoint instruction of the computer software application, wherein the token includes a copy of the target instruction and a computer memory address that indicates where the target instruction is located, and wherein the waypoint instruction lies along an execution path that leads to the target instruction;

determining, by one or more processors, responsive to detecting execution of the target instruction, whether the token exists that is associated with the target instruction; and performing, by one or more processors, a computer-security-related remediation action responsive to determining that the token does not exist.

2. The method of claim 1, further comprising:

determining, by one or more processors, responsive to determining that the token exists, whether the token is expired, wherein the token indicates an expiration time for the token; and performing, by one or more processors, a computer-security-related remediation action responsive to determining that the token is expired.

3. The method of claim 1, wherein the computer-security-related remediation action is terminating execution of the computer software application and providing a computer-security-related notification to a user of a computer where the computer software application is executed.

4. The method of claim 1, further comprising configuring, by one or more processors, the computer software application to generate the token.

5. The method of claim 4, wherein the configuring comprises configuring the computer software application during execution of the computer software application.

6. A computer program product for dynamic verification of a computer software application execution path, the computer program product comprising:
one or more computer readable storage devices and program instructions stored on the one or more computer readable storage devices, the program instructions comprising:
program instructions to generate, responsive to detecting execution of a waypoint instruction of a computer software application, a token indicating an expiration time for the token as the time when the token is generated plus an expected elapsed time between execution of the waypoint instruction and execution of a target instruction of the computer software application;
program instructions to detect execution of the target instruction of the computer software application,
wherein the computer software application is configured to generate the token at an instruction near the waypoint instruction of the computer software application, wherein the token includes a copy of the target instruction and a computer memory address that indicates where the target instruction is located, and
wherein the waypoint instruction lies along an execution path that leads to the target instruction;
program instructions to determine, responsive to detecting execution of the target instruction, whether the token exists that is associated with the target instruction; and
program instructions to perform a computer-security-related remediation action responsive to determining that the token does not exist.

7. The computer program product of claim 6, further comprising program instructions, stored on the one or more computer readable storage devices, to:
determine, responsive to determining that the token exists, whether the token is expired, wherein the token indicates an expiration time for the token; and
perform a computer-security-related remediation action responsive to determining that the token is expired.

8. The computer program product of claim 6, wherein the computer-security-related remediation action is terminating execution of the computer software application and providing a computer-security-related notification to a user of a computer where the computer software application is executed.

9. The computer program product of claim 6, further comprising program instructions, stored on the one or more computer readable storage devices, to configure the computer software application to generate the token.

10. The computer program product of claim 9, wherein the program instructions to configure comprise program instructions to configure the computer software application during execution of the computer software application.

11. A system for dynamic verification of a computer software application execution path, the system comprising:
one or more computer processors, one or more computer readable storage devices, and program instructions stored on the one or more computer readable storage devices for execution by at least one of the one or more processors, the program instructions comprising:
program instructions to generate, responsive to detecting execution of a waypoint instruction of a computer software application, a token indicating an expiration time for the token as the time when the token is generated plus an expected elapsed time between execution of the waypoint instruction and execution of a target instruction of the computer software application;
program instructions to detect execution of the target instruction of the computer software application,
wherein the computer software application is configured to generate the token at an instruction near the waypoint instruction of the computer software application, wherein the token includes a copy of the target instruction and a computer memory address that indicates where the target instruction is located, and
wherein the waypoint instruction lies along an execution path that leads to the target instruction;
program instructions to determine, responsive to detecting execution of the target instruction, whether the token exists that is associated with the target instruction; and
program instructions to perform a computer-security-related remediation action responsive to determining that the token does not exist.

12. The system of claim 11, further comprising program instructions, stored on the one or more computer readable storage devices for execution by at least one of the one or more processors, to:
determine, responsive to determining that the token exists, whether the token is expired, wherein the token indicates an expiration time for the token; and
perform a computer-security-related remediation action responsive to determining that the token is expired.

13. The system of claim 11, wherein the computer-security-related remediation action is terminating execution of the computer software application and providing a computer-security-related notification to a user of a computer where the computer software application is executed.

14. The system of claim 11, further comprising program instructions, stored on the one or more computer readable storage devices for execution by at least one of the one or more processors, to configure the computer software application to generate the token.

15. The system of claim 14, wherein the program instructions to configure comprise program instructions to configure the computer software application during execution of the computer software application.

* * * * *